(12) United States Patent
Horton

(10) Patent No.: US 9,701,466 B1
(45) Date of Patent: Jul. 11, 2017

(54) CONSTRUCTION MATERIAL TRANSPORT CONTAINER FOR NEW MATERIAL DELIVERY AND USED MATERIAL REMOVAL

(71) Applicant: ASR Holding Company, Barrington, RI (US)

(72) Inventor: Jonathon Daniel Horton, Barrington, RI (US)

(73) Assignee: ASR Holding Company, Barrington, RI (US)

( * ) Notice: Subject to any disclaimer, the term of this patent is extended or adjusted under 35 U.S.C. 154(b) by 0 days.

(21) Appl. No.: 15/201,162

(22) Filed: Jul. 1, 2016

(51) Int. Cl.
| | | |
|---|---|---|
| *B65G 67/04* | (2006.01) | |
| *B65D 88/02* | (2006.01) | |
| *B65D 88/56* | (2006.01) | |
| *B65D 88/12* | (2006.01) | |
| *B65D 90/00* | (2006.01) | |

(52) U.S. Cl.
CPC ....... *B65D 90/0033* (2013.01); *B65D 88/022* (2013.01); *B65D 88/12* (2013.01); *B65D 88/56* (2013.01); *B65D 90/008* (2013.01); *B65G 67/04* (2013.01)

(58) Field of Classification Search
CPC   B65D 90/008; B65D 90/0033; B65D 88/022; B65D 88/12; B65D 88/56
See application file for complete search history.

(56) References Cited

U.S. PATENT DOCUMENTS

| | | | |
|---|---|---|---|
| 3,374,915 A | 3/1968 | Verhein et al. | |
| 3,387,730 A * | 6/1968 | Levitt ...................... | B01J 23/94 414/608 |
| 4,809,851 A | 3/1989 | Oestreich et al. | |
| 5,161,709 A | 11/1992 | Oestreich et al. | |
| 7,717,290 B2 * | 5/2010 | Gerding ............... | B65D 88/121 220/1.5 |
| 8,322,924 B2 | 12/2012 | Noble et al. | |
| 8,833,593 B2 | 9/2014 | Martheenal | |
| 2008/0029508 A1 * | 2/2008 | Kochanowski ...... | B65D 88/005 220/1.5 |
| 2008/0251403 A1 * | 10/2008 | Nielsen ................ | B65D 88/121 206/386 |
| 2009/0272738 A1 * | 11/2009 | Marcel ................. | B65D 90/008 220/1.5 |
| 2010/0191615 A1 * | 7/2010 | Thomas .................... | B61D 3/20 705/26.1 |
| 2012/0296781 A1 | 11/2012 | Edwards et al. | |

* cited by examiner

*Primary Examiner* — Michael McCullough
*Assistant Examiner* — Ashley Romano
(74) *Attorney, Agent, or Firm* — Patent GC LLC; Alexander Franco

(57) ABSTRACT

A construction material transport container includes four side doors that form substantially all of two side walls of the container. The container includes transversely disposed forklift pockets that can be used to load the container onto a flatbed truck. With the container on a truck and the side doors open, new construction materials can be loaded onto the container from both sides. Both the container and the new materials can be delivered to a job side by a single delivery using a truck-attached forklift. The empty container can then be used as a receptacle for recyclable materials. The container further includes roll-off or hook lift vehicle tracks configured so that the container can be picked up and hauled to a recycling or refuse center. A rear door of the container can be opened so that the container can be tilted by the vehicle to offload the used material.

22 Claims, 12 Drawing Sheets

CONSTRUCTION MATERIAL TRANSPORT CONTAINER FOR NEW MATERIAL DELIVERY AND USED MATERIAL REMOVAL

BACKGROUND

In the residential roofing industry, when replacing an asphalt shingle roof, new shingles must be delivered to a job site and old shingles must be removed from the job site. To remove old shingles from the job site, a container is typically delivered and left by a roll-off or hook lift vehicle, the container is loaded with old shingles, and then a roll-off or hook lift vehicle returns, picks up the container, takes the container to a recycling or refuse site to be emptied. The vehicle then returns the container to inventory or delivers it to another job site. Three separate round-trips, therefore, are typically required to the job site including the delivery of the new materials, the drop off of the empty container, and the pickup of the filled container.

SUMMARY

In accordance with one embodiment, a construction material transport container includes four side doors that form substantially all of two side walls of the container. The container includes transversely disposed forklift pockets that can be used with a forklift to load the container onto a flatbed truck. With the side doors swung open towards the interior of the container, a forklift operator can safely see through the container without obstruction when handling the container. With the container placed on a truck and the side doors open, new construction materials, such as roofing shingles, can be loaded onto the container from both sides. In this manner, since the new materials are loaded onto the container, which has been placed on the truck, both the container and the new materials can be delivered to a job site by a single round-trip delivery, instead of two, while using only a small amount of extra space on the bed of the truck.

At the job site, the new materials can be similarly removed using a truck-attached forklift or a boom truck crane. The truck-attached forklift or boom truck crane can also be used to remove the container and place it at the job site. The empty container's doors can be closed so it can then be used as a receptacle for recyclable or refuse materials, such as used shingles. The container further includes tracks and attachment points configured so that the container, filled with used material, can be picked up and hauled by either a roll-off or hook lift vehicle to a recycling or refuse center. A rear door of the container can be opened so that the container can be tilted by the vehicle to offload the used material. Accordingly, the typical three round-trips to the jobs site to deliver new construction materials and pick up used materials can be reduced to two round-trips.

The container can be configured with one or more interior doors that partition off one or more separate sections of the container for transport of smaller items to or from the job site. The container can be configured with top stacking couplings on a top side of the container and bottom stacking couplings on a bottom side of the container. The stacking couplings can be used to stack multiple containers atop one another for storage. The container can be configured with two or more cable attachment points at which an overhead cables can be attached to lift the container. The cable attachment points can be used by a boom truck crane with cables to lift the container onto or off of a boom truck bed.

In one aspect, a material transport container includes: a base frame assembly including: a floor for supporting contained materials, a base frame configured for supporting the floor, the base frame including: two longitudinally disposed tracks configured for receipt upon a transport vehicle, and two forklift pockets transversely disposed perpendicular to the tracks, each of the plurality of forklift pockets configured for receiving a forklift blade, and a front wall extending upward from and perpendicular to the floor and extending inward from each of two sides of the base frame assembly towards the other of the two sides of the base frame assembly; a plurality side doors hinged to the base frame assembly, wherein each side door is: configured to swivel orthogonally to the floor, configured to form at least a portion of one of two side walls of the container when in a closed position, and disposed above and orthogonal to, when in a closed position and when viewed from a side elevation view of the container, at least one of the forklift pockets; and one or more rear doors hinged to the base frame assembly, the one or more rear doors configured to swivel orthogonally to the floor and to form substantially all of a rear wall of the container when in a closed position, wherein each rear door is disposed above and orthogonal to, when in a closed position and when viewed from a rear elevation view of the container, at least one of the tracks.

The container can be configured such that, for at least two of the plurality of side doors, the two side doors are positioned on opposite sides of the container when in a closed position.

The container can be configured such that the plurality of side doors are configured to open by at least swinging inward over the floor.

The container can be configured such that the plurality of side doors includes four side doors, and such that two of the four side doors are positioned on opposite sides of the base frame assembly from another two of the four side doors when the four side doors are in a closed position.

The container can be configured such that each of the forklift pockets includes a sleeve configured for receiving a forklift blade.

The container can be configured such that each of the forklift pockets further includes at least one pass-through passing through one of the tracks and permitting passage of a forklift blade through the track.

The container can further include a coupling bar configured to be grasped by a hook lift transport vehicle in order to load the container on the hook lift transport vehicle.

The container can further include a cable hook configured to be grasped by a winch cable in order to load the container upon a roll-off transport vehicle.

The container can further include at least one interior door hinged to the base frame assembly, the at least one interior door configured to swivel orthogonally to the floor and configured to divide the container into a plurality of interior spaces.

The container can further include a cable hook housing integrated into the front wall.

The container can further include four bottom stacking couplings positioned on a bottom side of the base frame and four top stacking couplings each positioned on or above one of the two side walls, the bottom stacking couplings and the top stacking couplings configured to be aligned and received by top stacking couplings and bottom stacking couplings respectively of other similarly configured containers, to support stacking of multiple material transport containers atop one another.

The container can be configured such that each of the side doors includes a panel section, wherein the panel section is formed from a rigid composite material that is not primarily metal.

The container can be configured such that the floor is formed from the rigid composite material.

The container can be configured such that the rigid composite material is fiberglass reinforced polymer.

The container can be configured such that the base frame is formed primarily of metal.

The container can be configured such that the base frame assembly further includes four upright sections extending upwardly from the base frame orthogonal to the floor, wherein the side doors and the at least one rear door are each hinged to one of the four upright sections.

The container can be configured such that each of the four upright sections is an I-beam section.

The container can be configured such that each of the four metal I-beam sections includes a lift cable attachment point at a top end of the I-beam section.

The container can be configured such that each of the four metal I-beam sections includes a top end portion configured to be aligned with and received by bottom stacking couplings of other similarly configured containers to support stacking of multiple material transport containers atop one another.

In one aspect, a material transport container includes: a base frame assembly including: a floor for supporting contained materials, and a base frame configured for supporting the floor, the base frame including two longitudinally disposed tracks configured for receipt upon a transport vehicle, and a front wall extending upward from and perpendicular to the floor and extending inward from each of two sides of the base frame assembly towards the other of the two sides of the base frame assembly; two pairs of side doors hinged to the base frame assembly, configured to swivel orthogonally to the floor, and positioned on opposite sides of the container, wherein each pair of side doors extends along an opening of at least two thirds of a length of a side of the container when the side doors are in a closed position; and one or more rear doors hinged to the base frame assembly, the one or more rear doors configured to swivel orthogonally to the floor and to form substantially all of a rear wall of the container when in a closed position, wherein each rear door is disposed above and orthogonal to, when in a closed position and when viewed from a rear elevation view of the container, at least one of the tracks.

The container can be configured such that the base frame assembly further includes a plurality of cable attachment points configured for lifting the container from overhead.

The container can be configured such that the opening is at least three quarters of the length of the side of the container.

The container can be configured such that the side doors are configured to open by at least swinging inward over the floor.

In one aspect, a method for delivering materials and a material transport container includes: loading the material transport container onto a transport vehicle, wherein the material transport container comprises side doors that can be opened to form openings along two sides of the container, wherein each of the openings has a width that extends along at least two thirds of a length of the container; opening the side doors of the material transport container to form the openings; while the material transport container is on the transport vehicle, a forklift loading materials onto the container from both of the two sides of the container through the openings without the forklift boarding the transport container; navigating the transport vehicle, loaded with the material transport container and the materials, to a destination; while the material transport container is on the transport vehicle, using a machine to unload the materials from the container from both of the two sides of the container through the openings; and after unloading the materials, using the same machine to unload the material transport container from the vehicle.

The method can be performed such that the machine is selected from a group consisting of: a truck-mounted forklift and a boom truck crane.

DETAILED DESCRIPTION

In the following description, references are made to various embodiments in accordance with which the disclosed subject matter can be practiced. Multiple references to "one embodiment" or "an embodiment" do not necessarily refer to the same embodiment. Particular features, structures or characteristics associated with such embodiments can be combined in any suitable manner in various embodiments. References are also made to the accompanying drawings in which the same reference numbers are used throughout to refer to the same or like components.

Figure 1A:
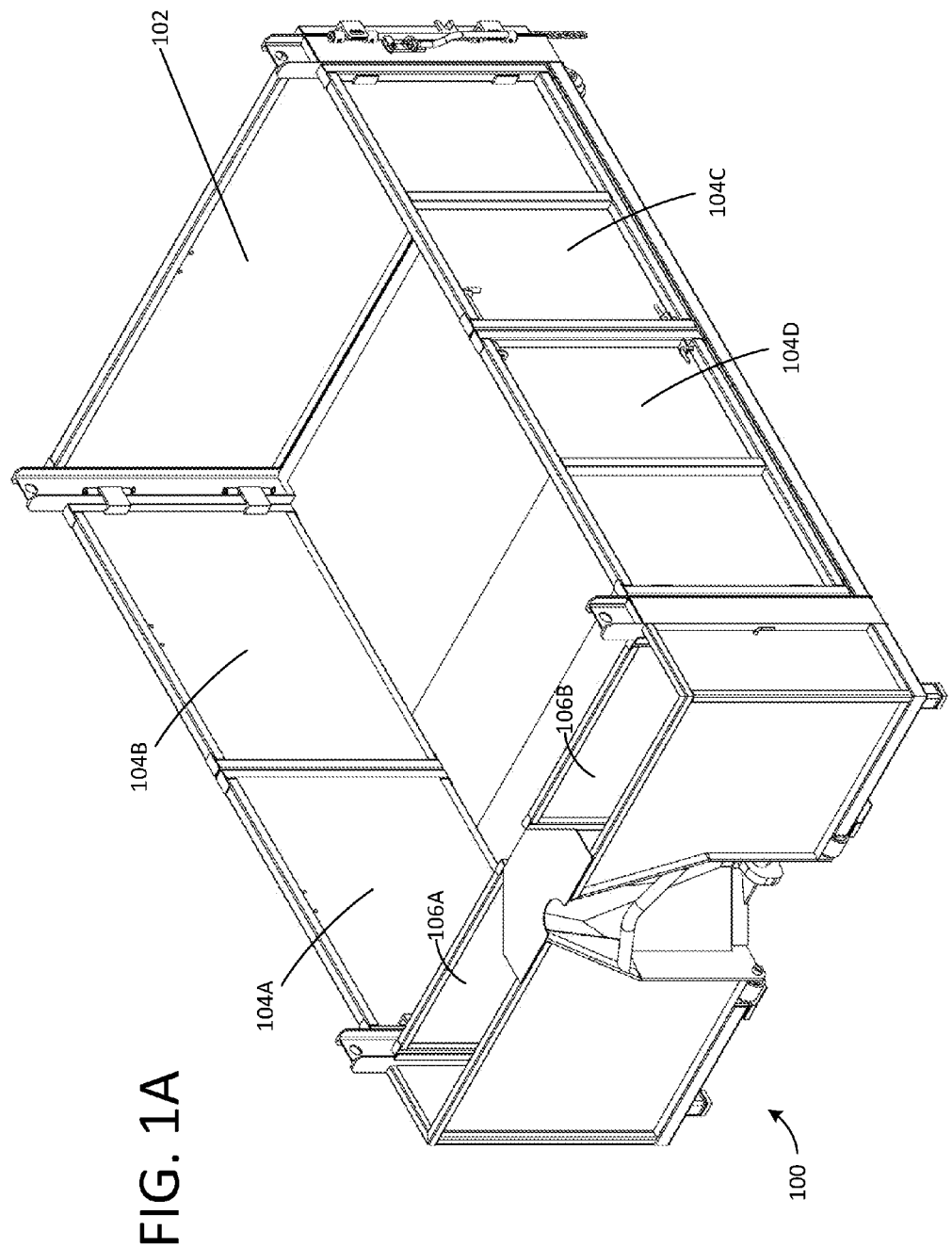
FIGS. 1A-D illustrate a material transport container in various configurations in accordance with one embodiment.
Figure 1B:
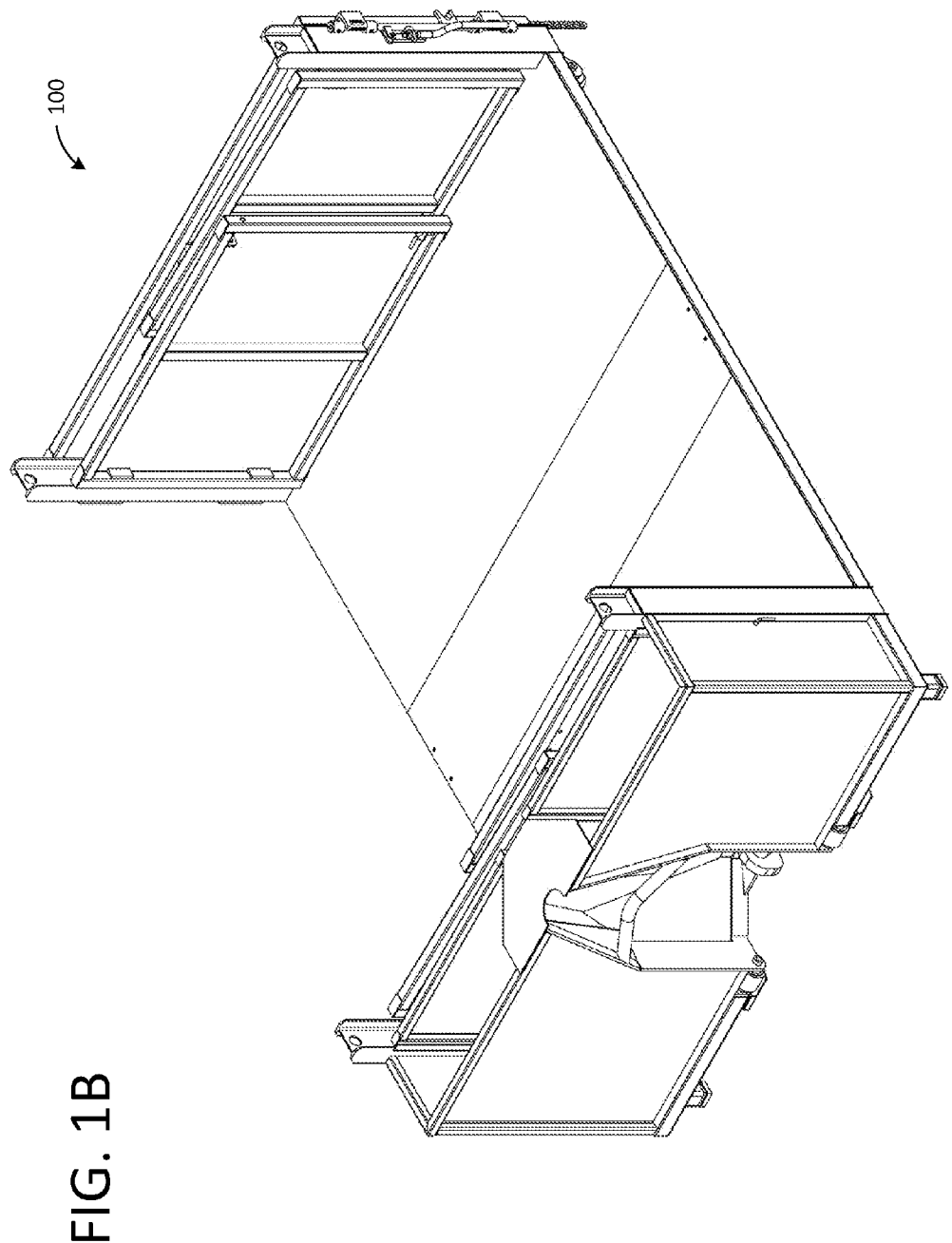
Figure 1C:
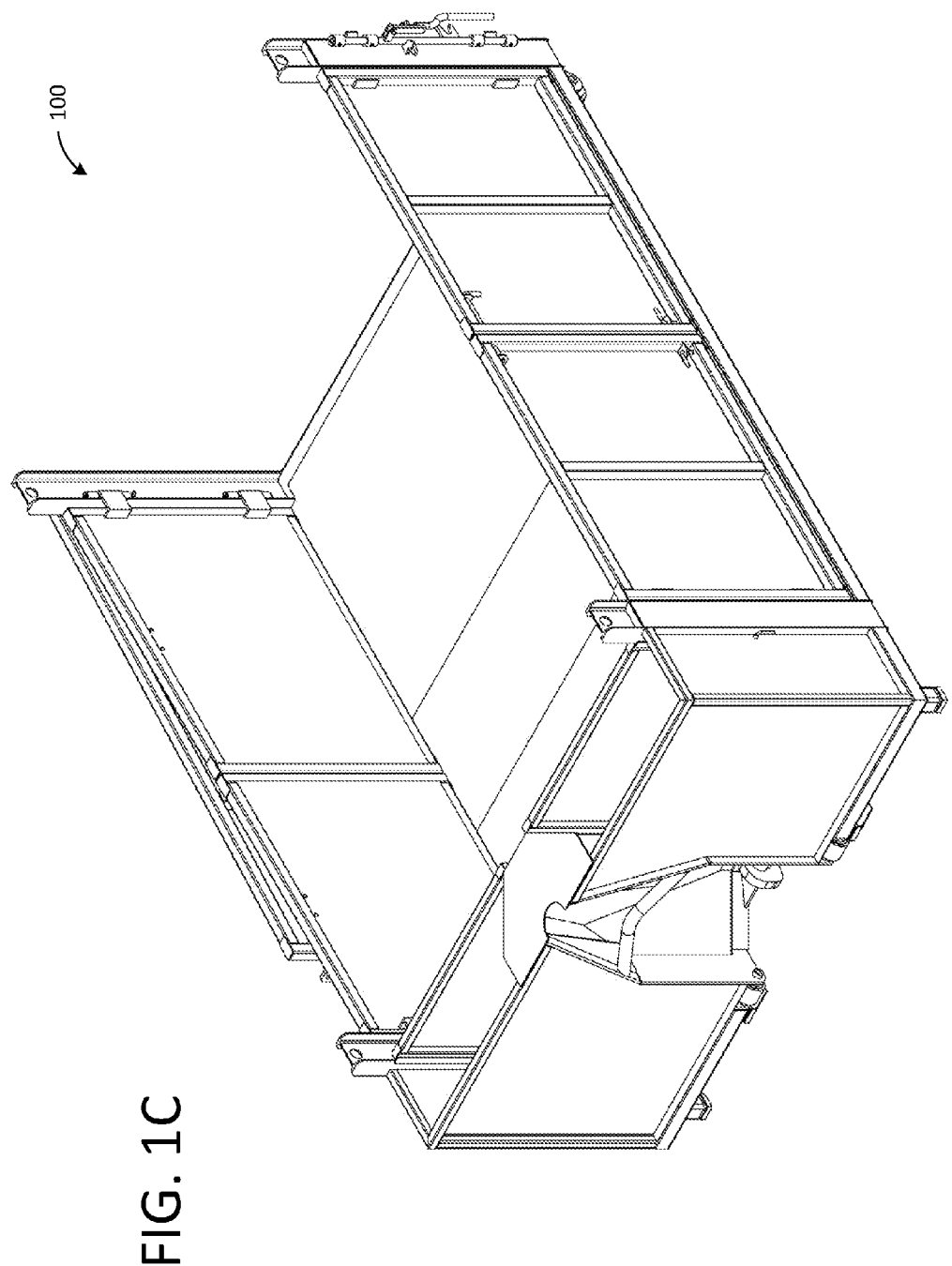
Figure 1D:
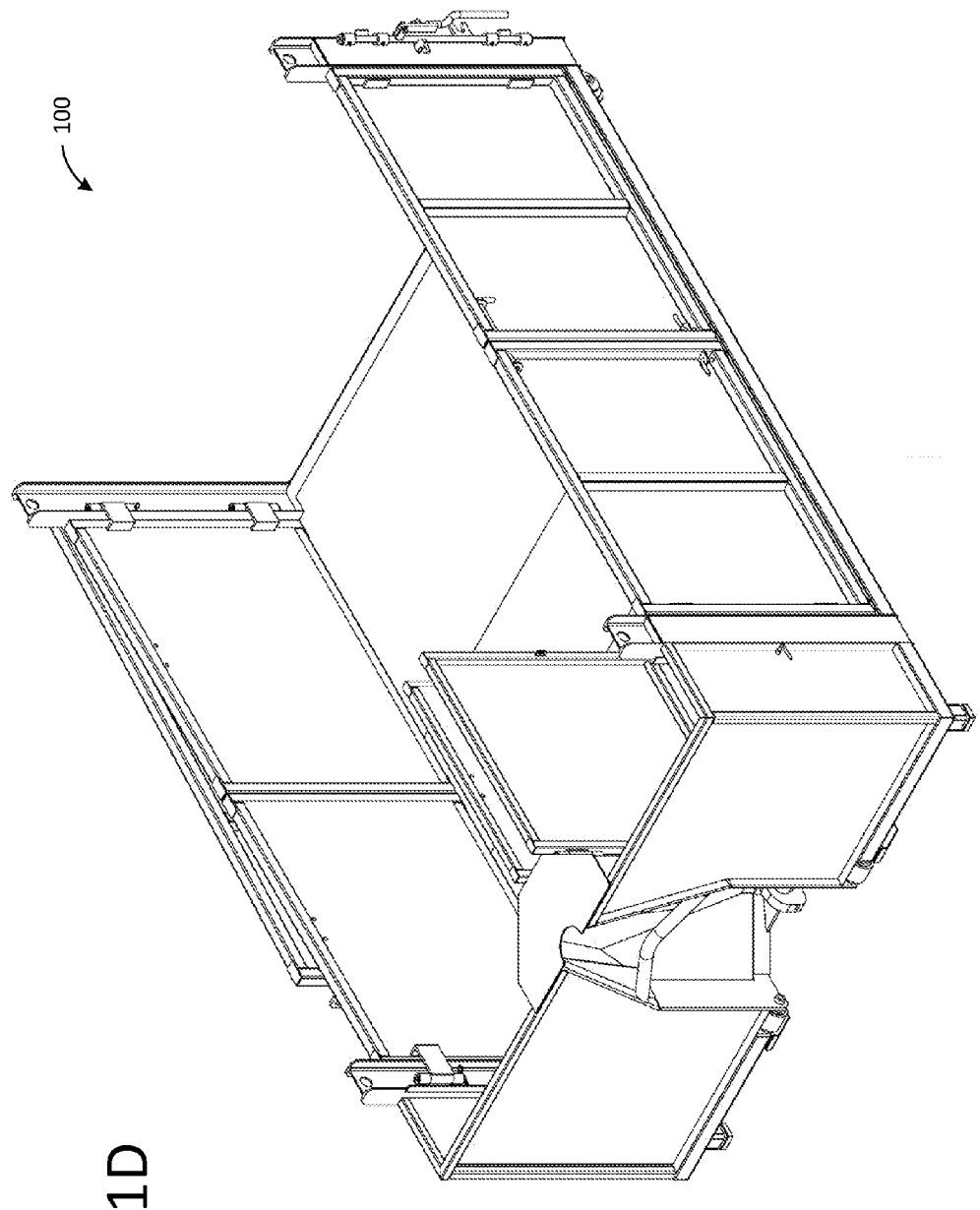

FIGS. 1A-D illustrate a material transport container 100 in various configurations in accordance with one embodiment. The container 100 includes one rear door 102, two pairs of side doors 104A-D, and two interior doors 106A-B. The rear door 102, when closed, can form part or substantially all of a rear wall of the container 100. The side doors 104, when closed, can form part or substantially all of two side walls of the container 100. FIG. 1A illustrates the container 100 with all its doors in closed positions. FIG. 1B illustrates the container 100 with its side doors 104A-D latched in an open position, swung to the interior of the container. FIG. 1C illustrates the container 100 with its rear door 102 held in an open position, swung around the outside of the container. FIG. 1D illustrates the container 100 with its two interior doors 106A-B in an open position, providing interior access to a separate section of the container.

In accordance with one embodiment, a single larger side door can be substituted for each pair of side doors. In accordance with one embodiment, more than two doors, or multiple pairs of doors can be included on each side optionally supported by added uprights or posts to which the additional doors are hinged.

Figures 2A, 2B:
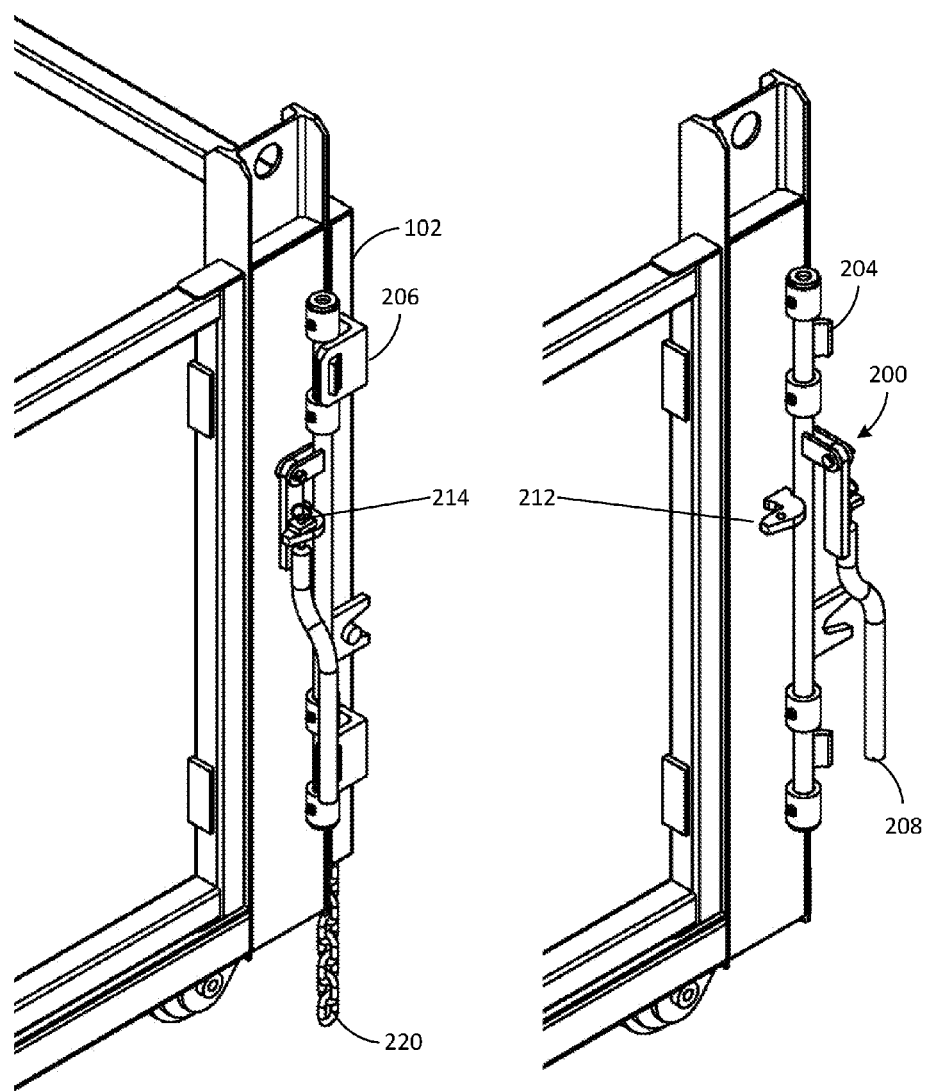
FIGS. 2A-B illustrate a latching mechanism for latching a rear door in a closed position in accordance with the illustrated embodiment.

FIGS. 2A-B illustrate a latching mechanism 200 for latching the rear door 102 in a closed position in accordance with the illustrated embodiment. FIG. 2A illustrates the rear door 102 in a closed position, secured by the latching mechanism 200. FIG. 2B illustrates the latching mechanism 200 in an unlatched position with the rear door not shown, having been moved to an open position. The latching mechanism 200 can include a vertically aligned rotating shaft with two latch arms 204 that catch on catches 206 on the rear door 102. The shaft can be rotated by hand using an arm 208 attached to the shaft and which swivels outward to increase leverage. When the shaft is rotated into a closed position, the arm 208 can be swiveled down and fixed in place by a catch 212, and further secured by a locking pin 214 that can be passed through a tab on the arm 208 and the catch 212. FIG. 2A also illustrates a chain 220 attached to an end of the rear door 102 that can be used to secure the rear door in a fully open position alongside a side of the container.

Figure 3:
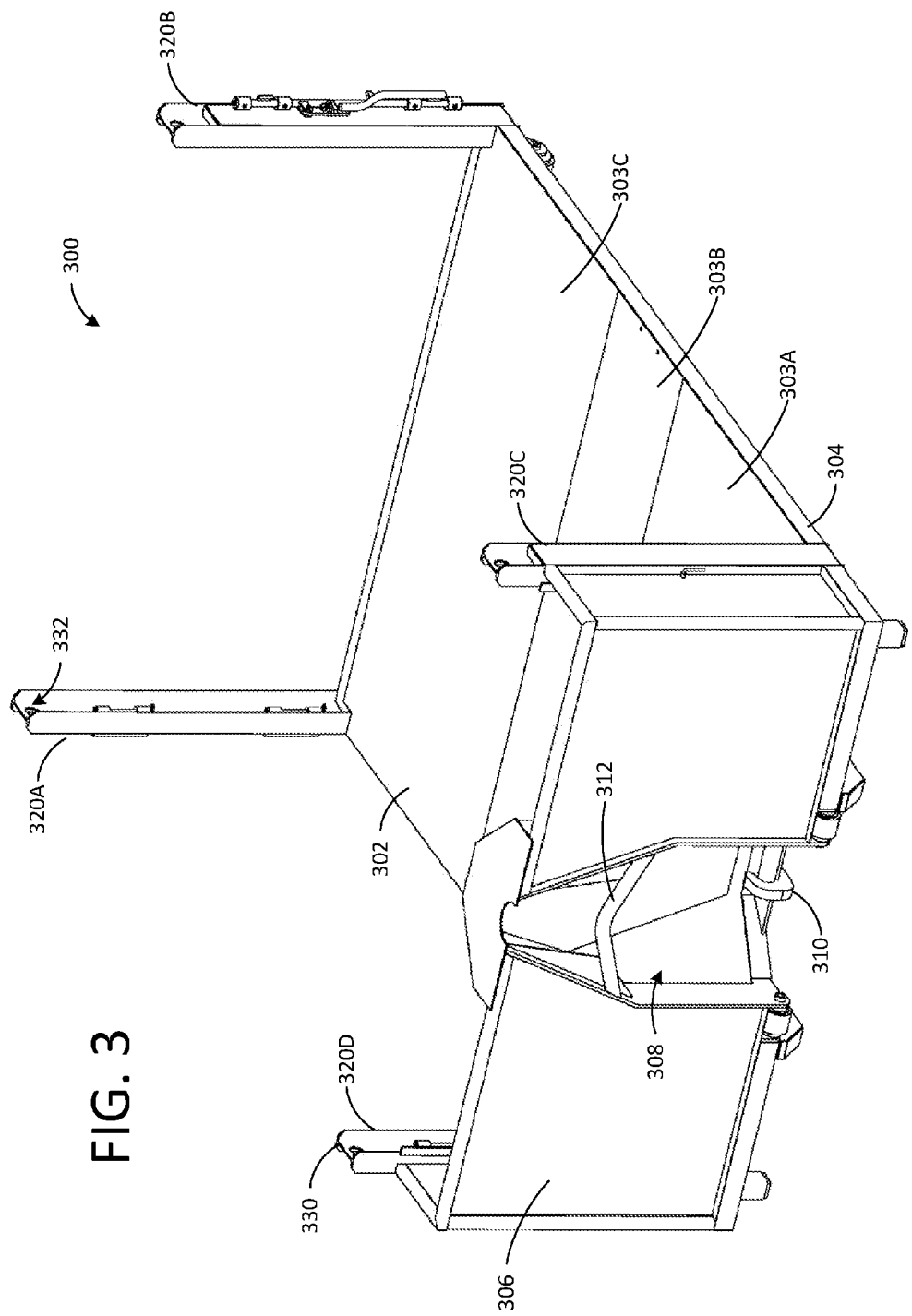
FIG. 3 illustrates a base frame assembly in accordance with the illustrated embodiment, omitting the doors of the container.

FIG. 3 illustrates a base frame assembly 300 in accordance with the illustrated embodiment, omitting the doors of the container 100. The base frame assembly 300 includes a floor 302 for supporting contained materials. The floor 302 is supported by a base frame 304, which can include perimeter and grid structure of rectangular steel tubing and ribs, as shown in additional detail in FIG. 4. The floor 302 can be formed from one or more floor panels 303A-C. In one embodiment, the floor panels 303 can be steel panels, which can be welded in place on the base frame 304. In one embodiment, one or more of the floor panels can be made of a weight-saving composite material, such as a fiberglass reinforced polymer, which can be adhered in place using an adhesive. One composite material product that can be used for the floor panels is SAFPLATE, which is manufactured from EXTREN by STRONGWELL OF Bristol, Va., U.S.A.

In the illustrated embodiment, the base frame assembly 300 includes a front wall 306 that extends at a perpendicular upward from the floor and extends inward from each of two sides of the base frame assembly 300 towards the other of the two sides of the base frame assembly 300. In one embodiment, a cable hook housing 308 can be integrated into the front wall 306, the floor 302 and the base frame 304 to accommodate space for a winch mechanism used on typical on roll-off transport vehicles. The base frame 304 can also include a cable hook 310 configured to be grasped by a winch cable in order to load the container upon a roll-off transport. The cable hook 310 can be positioned within the cable hook housing 308.

In the illustrated embodiment, the base frame assembly includes a coupling bar 312 configured to be grasped by a hook lift transport vehicle in order to load the container on the hook lift transport vehicle. The coupling bar 312 can be positioned within the cable hook housing 308. In one embodiment, the cable hook housing 308 and the cable hook 310 can be omitted, and the front wall 306 configured to extend straight across the front of the container without interruption. In this embodiment, the coupling bar 312 can be mounted to an outside portion of the front wall 306. In one embodiment, the cable hook 310 can be mounted to the front of the base frame 304 without a cable hook housing.

In the illustrated embodiment, the base frame assembly 300 includes four upright sections 320A-D that extend upwardly orthogonal to the floor 302 and to which doors can be hinged. In the illustrated embodiment, the two rear upright sections 320A-B are positioned at or near the rear corners of the container while the two front upright sections 320C-D are offset from the front corners of the container. In the illustrated embodiment, a section of side wall extends from each front upright section 320C-D to the front corner of the container. In one embodiment, the two front upright sections 320C-D can be positioned at or near the front corners of the container such that the two front side doors are hinged closer to the front of the container. In one embodiment, the rear upright sections 320A-B can be offset from the rear corners of the container along either the rear or the sides of the container. In one embodiment, the upright sections can be integrated into or formed by sections of side walls of the container.

Figure 9C:
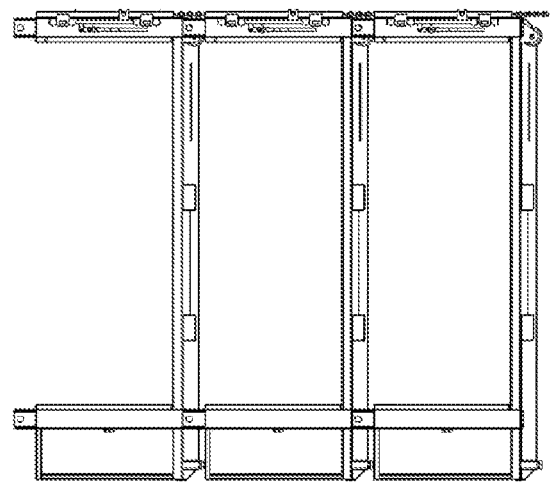
FIGS. 9A-C illustrate three different views of multiple containers in a stacked configuration in accordance with the illustrated embodiment.
Figure 9B:
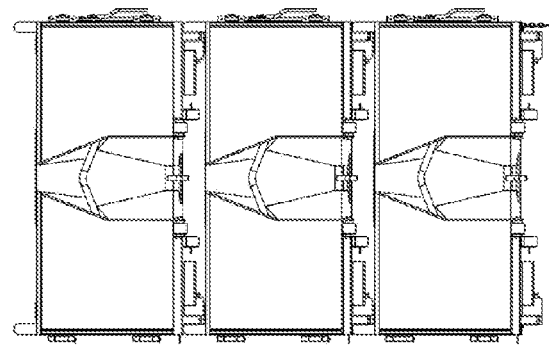
Figure 9A:
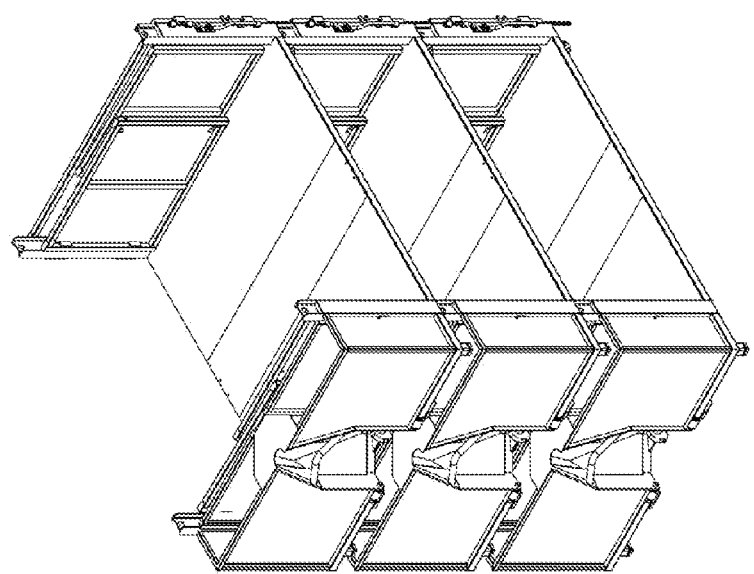

In the illustrated embodiment, the upright sections 320 or portions of the upright sections are formed using steel I-beam sections that are welded to the base frame 304. The top of each I-beam section can serve as one of four top stacking pedestals or couplings 330 upon which another container can be positioned in order to stack multiple containers as illustrated in FIGS. 9A-C. The top of each I-beam section can also include a hole or attachment point 332 to which lift hooks or cables can be attached for lifting and moving the container, such as by a boom truck crane.

In accordance with one embodiment, the length of the container is approximately 144", the width of the container is approximately 96", the height of the side walls or doors extends approximately 48" above the floor, and the openings on the sides of the container formed by the side doors are approximately 114 inches in length. In accordance with one embodiment, the openings on the sides of the container formed by the side doors extend along at least ⅔ of the length of the container. In accordance with one embodiment, the openings on the sides of the container formed by the side doors extend along at least ¾ of the length of the container. In accordance with one embodiment, the openings on the sides of the container formed by the side doors extend along at least ⅞ of the length of the container. In accordance with one embodiment, the openings on the sides of the container formed by the side doors extend along substantially all of the length of the container.

Figure 4:
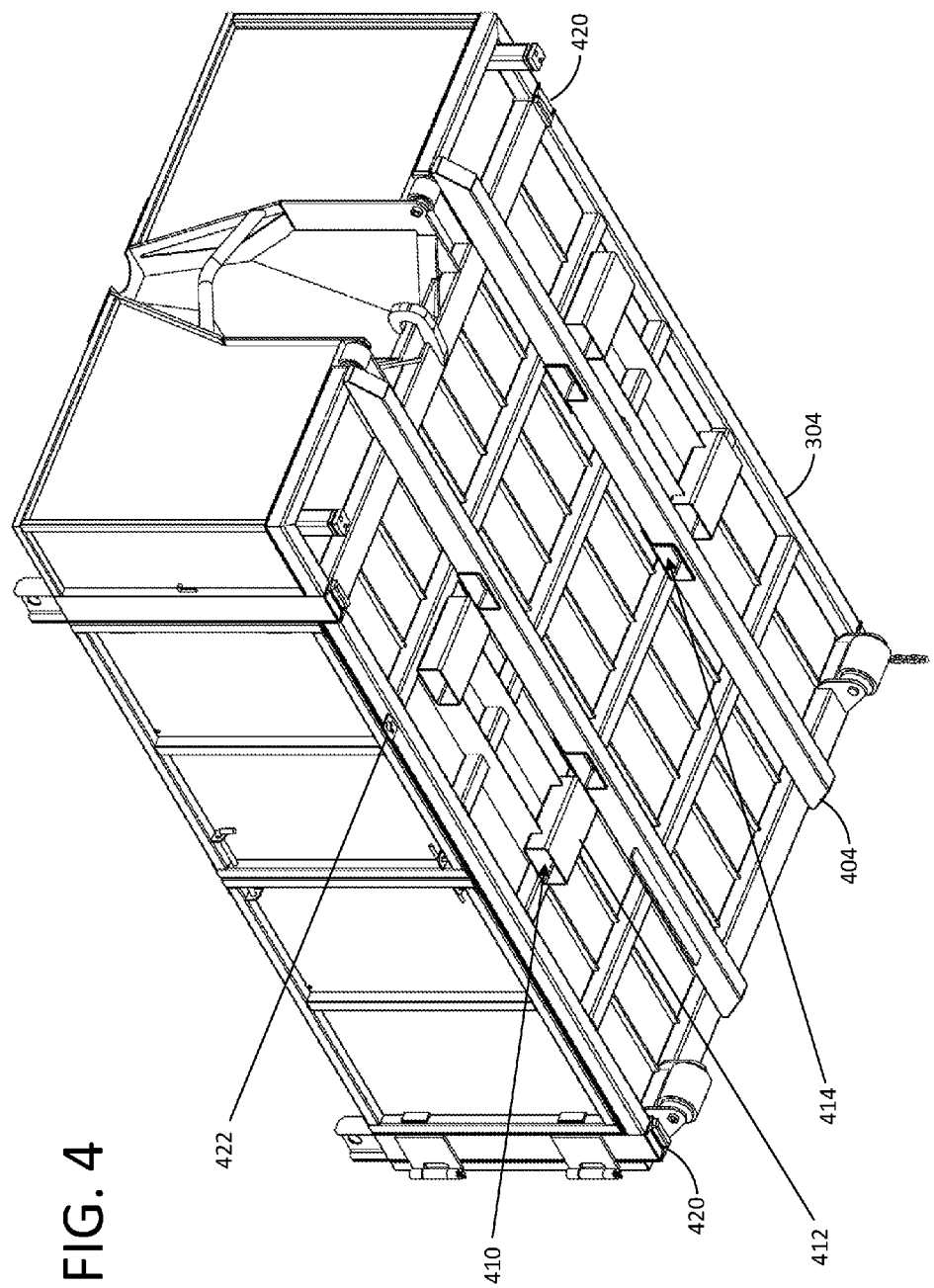
FIG. 4 illustrates an isometric perspective view of the bottom of the container in accordance with the illustrated embodiment.

FIG. 4 illustrates an isometric perspective view of the bottom of the container 100 in accordance with the illustrated embodiment. The base frame 304 can be constructed of a perimeter of rectangular steel tube surrounding a grid of rectangular steel tube and ribs. The base frame 304 can include two longitudinally disposed tracks 404 for guiding the container on and off of transport vehicles, such as roll-off or hook lift vehicles.

The base frame 304 can also include two or more forklift pockets 410 transversely disposed perpendicular to the tracks. The forklift pockets 410 are openings in the base frame 304 configured to receive the tines of a forklift from a side of the container. In the illustrated embodiment, the forklift pockets 410 are formed in part by sleeves 412 attached to the underside of the base frame 304 and in part by openings 414 in the tracks 404. The pockets 410 can be constructed by providing holes and/or sleeves in or through any additional or suitable structure within or on the base frame 304.

The base frame 304 can also include a set of bottom stacking couplings 420 configured to receive the top stacking couplings 330 of another container when multiple containers are stacked. The base frame 304 can also include tab 422 with a chain keyhole configured to receive the chain 220 of the rear door to secure the rear door in a fully open position.

Figure 5:
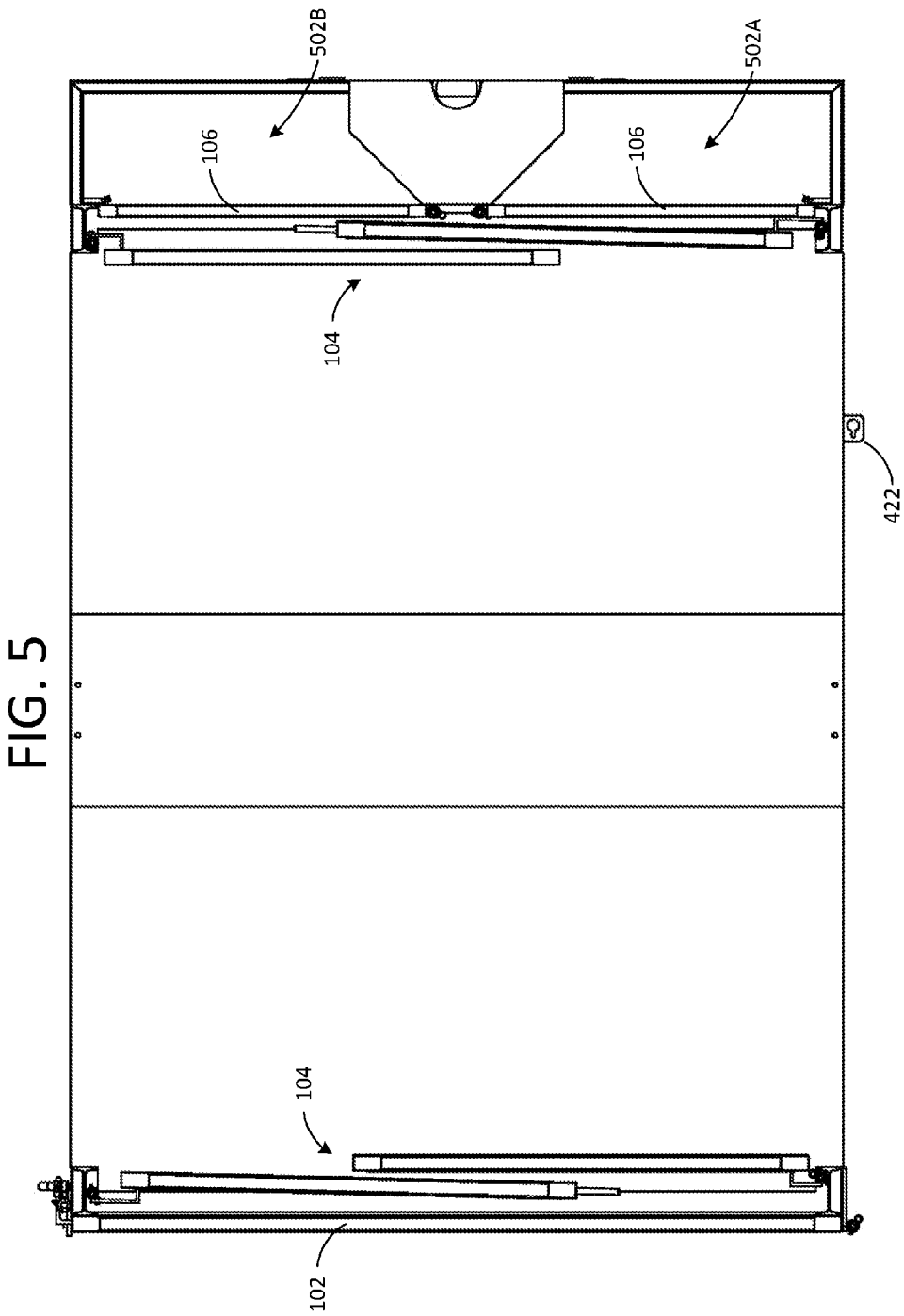
FIG. 5 illustrates a top plan view of the container in accordance with the illustrated embodiment.

FIG. 5 illustrates a top plan view of the container 100 in accordance with the illustrated embodiment. As shown, the side doors 104 are shown in an open position, swung towards the interior of the container. In the illustrated embodiment, the hinges are configured such that the side doors swing only inwards. In one embodiment, however, the hinges can be repositioned so that the side doors can swing either inwards or outwards. FIG. 5 also illustrates two interior spaces 502A-B, created by the interior doors 106, separate from the container's main compartment. These separate spaces can be used, for example, to deliver less bulky new construction materials, such as fasteners, adhesives, etc. that might otherwise not be easily secured within the main compartment. The separate spaces can also be used, after the delivery of new materials, to collect non-recyclable material when the main compartment is used for recyclable materials, such as asphalt roofing shingles.

Figure 6:
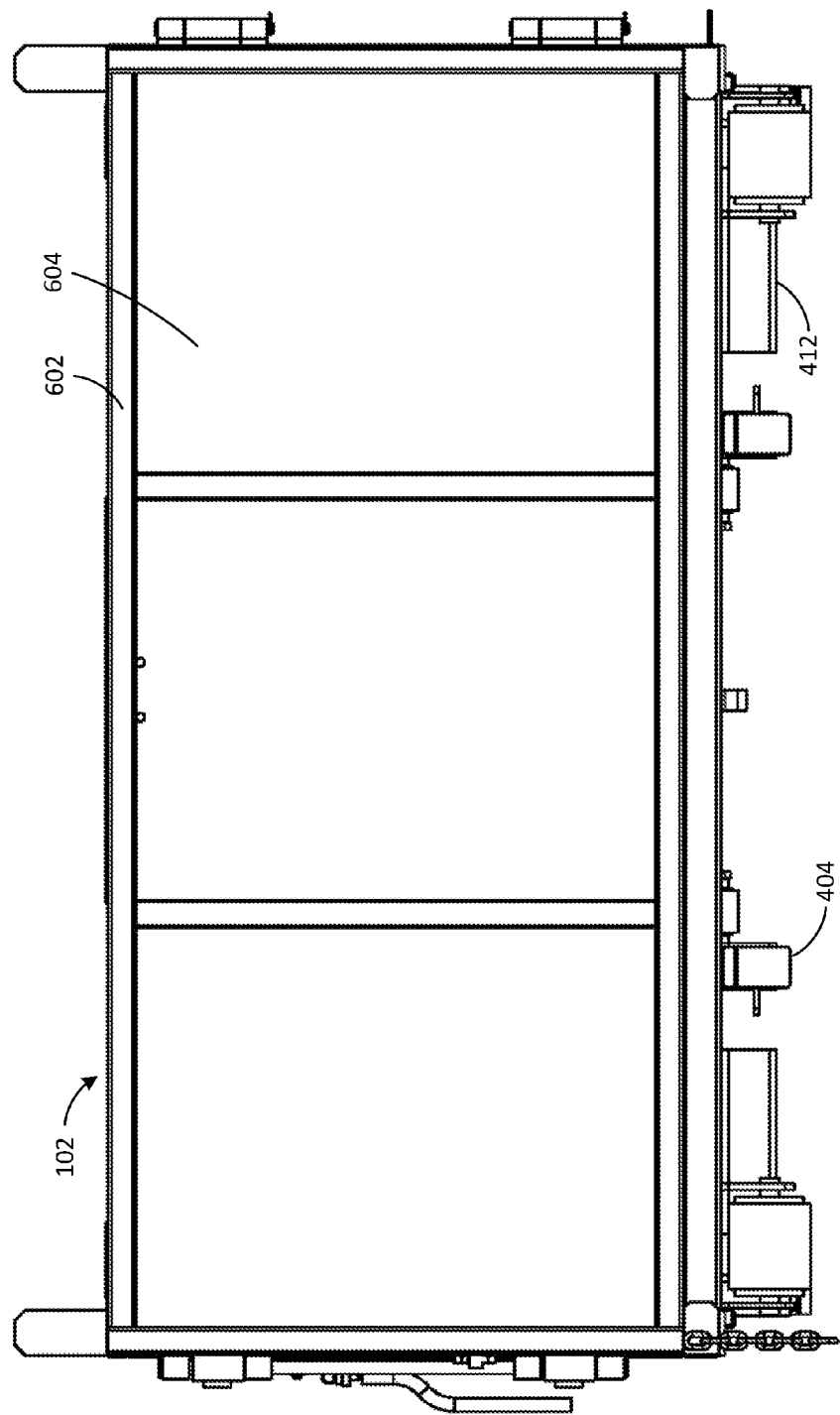
FIG. 6 illustrates a rear elevation view of the container in accordance with the illustrated embodiment.

FIG. 6 illustrates a rear elevation view of the container 100 in accordance with the illustrated embodiment. In the illustrated embodiment, when viewed from the rear elevation view, the rear door 102 is positioned above and orthogonal to the tracks 404 when the rear door is in a closed position. In one embodiment, two rear doors can be used in place of the one illustrated rear door in a configuration similar to the side doors as illustrated in other figures.

The rear door 102, shown in a closed position, can be constructed of a rectangular steel tubing frame 602 that supports a number of door panels 604. In one embodiment, the door panels 604 can be steel panels, which can be welded in place on the frame 602. In one embodiment, one or more of the door panels can be made of a weight-saving composite material, such as the same material used for the floor panels 303. The composite panels can be secured in place, for example, using a blind stop configuration with a retainer or using a C-channel attached to the frame 602. The side doors 104 and interior doors 106 can also be constructed using one or more of the foregoing techniques.

Figure 7:
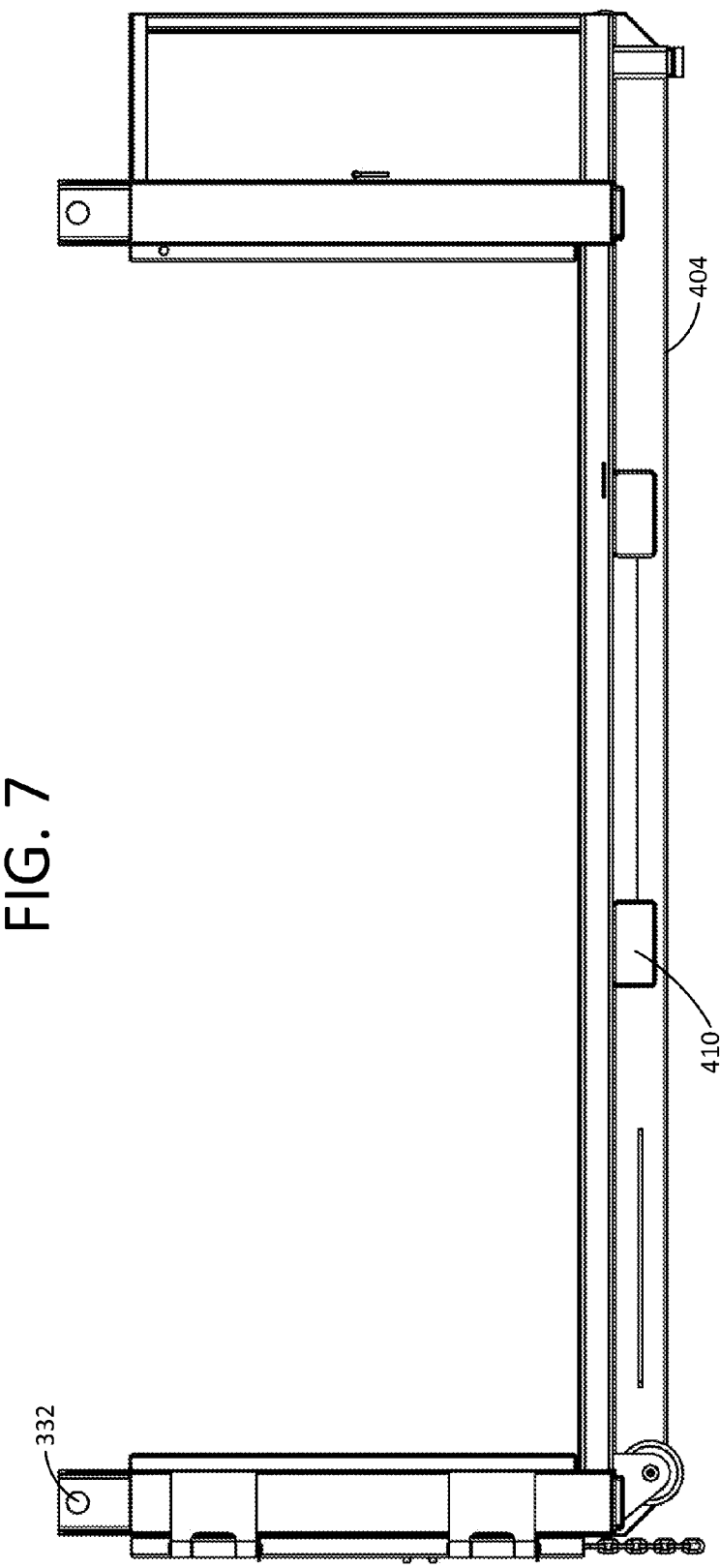
FIG. 7 illustrates a side elevation view of the container in accordance with the illustrated embodiment.

FIG. 7 illustrates a side elevation view of the container in accordance with the illustrated embodiment. In the illustrated embodiment, when viewed from the side elevation view, the side doors 104 would each be positioned above and orthogonal to one of the forklift pockets 410 when the side doors are in a closed position. When the side doors 104 are in an open position, a forklift operator lifting and moving the container can safely see through the container without his vision being obstructed by a container wall or door.

Figure 8:
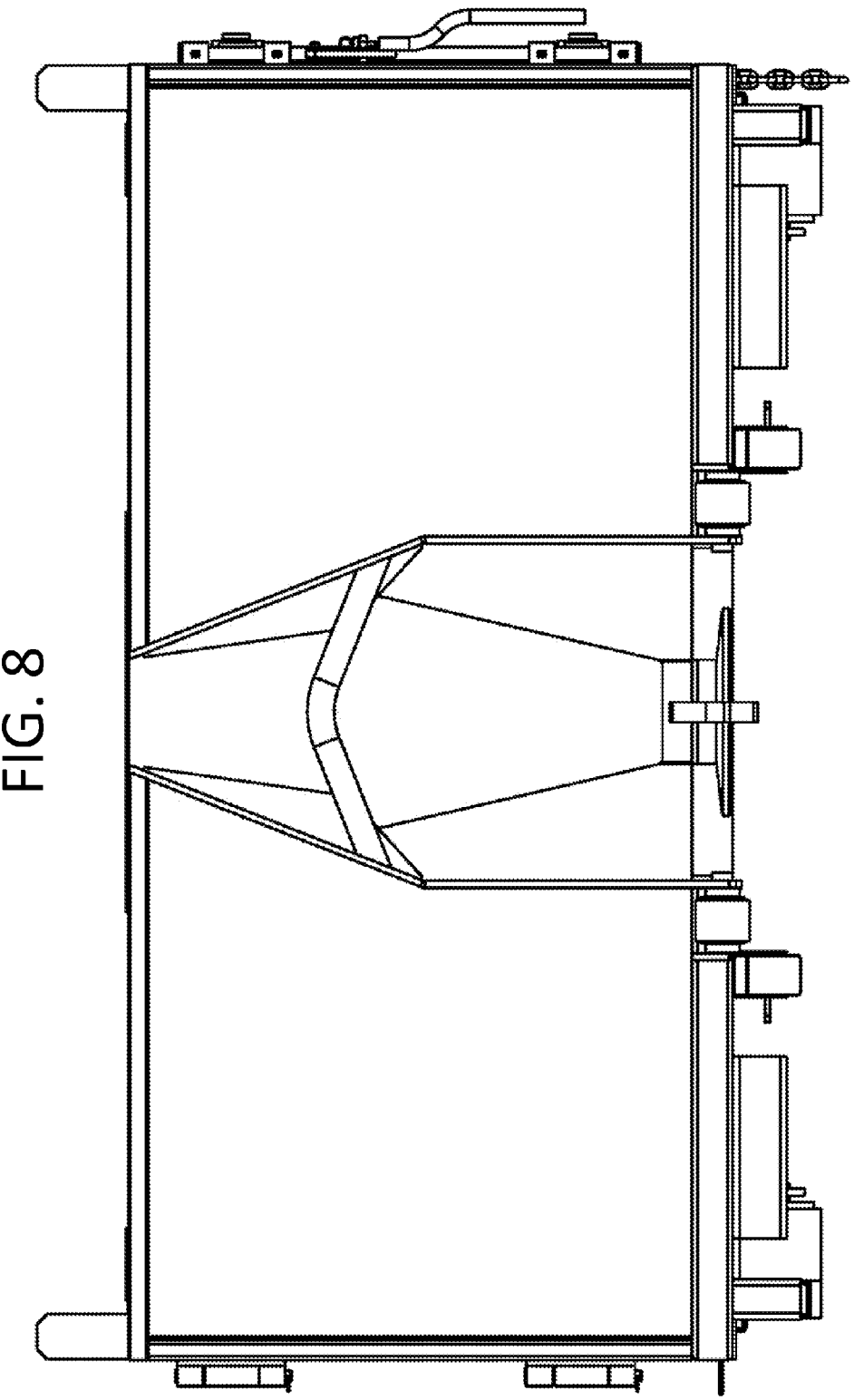
FIG. 8 illustrates a front elevation view of the container in accordance with the illustrated embodiment.

FIG. 8 illustrates a front elevation view of the container in accordance with the illustrated embodiment.

FIGS. 9A-C illustrate three different views of multiple containers in a stacked configuration in accordance with the illustrated embodiment.

Although the subject matter has been described in terms of certain embodiments, other embodiments, including embodiments which may or may not provide various features and advantages set forth herein will be apparent to those of ordinary skill in the art in view of the foregoing disclosure. The specific embodiments described above are disclosed as examples only, and the scope of the patented subject matter is defined by the claims that follow.

The invention claimed is:

1. A material transport container comprising:
a base frame assembly comprising:
a floor for supporting contained materials,
a base frame configured for supporting the floor, the base frame comprising:
two longitudinally disposed tracks configured for receipt upon a transport vehicle, and
two forklift pockets transversely disposed perpendicular to the tracks, each of the plurality of forklift pockets configured for receiving a forklift blade, and
a front wall extending upward from and perpendicular to the floor and extending inward from each of two sides of the base frame assembly towards the other of the two sides of the base frame assembly;
a plurality of side doors hinged to the base frame assembly, wherein the plurality of side doors are positioned on opposite sides of the container and are configured to be opened and secured over the floor such that the container can be moved using the forklift pockets while providing an open path for visual sight by a forklift operator from one side through and past an opposite side of the container, wherein the open path extends widthwise along at least a majority of the opposite side, and wherein each side door is:
configured to swivel orthogonally to the floor,
configured to open by at least swinging inward over the floor,
configured to form at least a portion of one of two side walls of the container when in a closed position, and
disposed above and orthogonal to, when in a closed position and when viewed from a side elevation view of the container, at least one of the forklift pockets; and
one or more rear doors hinged to the base frame assembly, the one or more rear doors configured to swivel orthogonally to the floor and to form substantially all of a rear wall of the container when in a closed position, wherein each rear door is disposed above and orthogonal to, when in a closed position and when viewed from a rear elevation view of the container, at least one of the tracks.

2. The container of claim 1, wherein each of the plurality of side doors has a swinging end opposite a hinged end, and wherein for at least one set of two of the plurality of side doors:
the two side doors are positioned on opposite sides of the container when the two side doors are in a closed position, and
the swinging ends of the two side doors are configured to interleave when the two side doors are swung to an open position over the floor.

3. The container of claim 1, wherein the plurality of side doors comprises four side doors, and wherein two of the four side doors are positioned on opposite sides of the base frame assembly from another two of the four side doors when the four side doors are in a closed position.

4. The container of claim 1, wherein the base frame assembly further comprises a plurality of cable attachment points configured for lifting the container from overhead.

5. The container of claim 4, wherein each of the forklift pockets further comprises at least one pass-through passing through one of the tracks and permitting passage of a forklift blade through the track.

6. The container of claim 1, further comprising a coupling bar configured to be grasped by a hook lift transport vehicle in order to load the container on the hook lift transport vehicle.

7. The container of claim 6, further comprising a cable hook configured to be grasped by a winch cable in order to load the container upon a roll-off transport vehicle.

8. The container of claim 7, further comprising a cable hook housing integrated into the front wall.

9. The container of claim 1, further comprising at least one interior door hinged to the base frame assembly, the at least one interior door configured to swivel orthogonally to the floor and configured to divide the container into a plurality of interior spaces.

10. The container of claim 1, further comprising four bottom stacking couplings positioned on a bottom side of the base frame and four top stacking couplings each positioned on or above one of the two side walls, the bottom stacking couplings and the top stacking couplings configured to be aligned and received by top stacking couplings and bottom stacking couplings respectively of other similarly configured containers, to support stacking of multiple material transport containers atop one another.

11. The container of claim 1, wherein each of the side doors comprises a panel section, wherein the panel section is formed from a rigid composite material that is not primarily metal.

12. The container of claim 11, wherein the floor is formed from the rigid composite material, and wherein the rigid composite material is fiberglass reinforced polymer.

13. The container of claim 1, wherein the base frame assembly further comprises four upright sections extending upwardly from the base frame orthogonal to the floor, wherein the side doors and the at least one rear door are each hinged to one of the four upright sections.

14. The container of claim 13, wherein each of the four upright sections comprises a lift cable attachment point at a top end of the upright section.

15. The container of claim 13, wherein each of the four upright sections is formed from an I-beam section, and wherein each of the four upright sections comprises a top end portion configured to be aligned with and received by bottom stacking couplings of other similarly configured containers to support stacking of multiple material transport containers atop one another.

16. A material transport container comprising:
a base frame assembly comprising:
  a floor for supporting contained materials, and
  a base frame configured for supporting the floor, the base frame comprising two longitudinally disposed tracks configured for receipt upon a transport vehicle, and
  a front wall extending upward from and perpendicular to the floor and extending inward from each of two sides of the base frame assembly towards the other of the two sides of the base frame assembly;
two pairs of side doors hinged to the base frame assembly, configured to swivel orthogonally to the floor and to open by at least swinging inward over the floor, and positioned on opposite sides of the container, wherein each pair of side doors extends along an opening of at least two thirds of a length of a side of the container when the side doors are in a closed position, and wherein the two pairs of side doors on opposite sides of the container are configured to be opened and secured over the floor such that the container can be moved while providing an open path for visual sight from one side through and past an opposite side of the container, wherein the open path extends widthwise along at least a majority of the opposite side; and
one or more rear doors hinged to the base frame assembly, the one or more rear doors configured to swivel orthogonally to the floor and to form substantially all of a rear wall of the container when in a closed position, wherein each rear door is disposed above and orthogonal to, when in a closed position and when viewed from a rear elevation view of the container, at least one of the tracks.

17. The container of claim 16, wherein the base frame assembly further comprises a plurality of cable attachment points configured for lifting the container from overhead.

18. The container of claim 16, wherein each of the side doors has a swinging end opposite a hinged end, and wherein the swinging end of each side door from a first of the two pairs of side doors is configured to interleave with a swinging end of one of the side doors of a second of the two pairs of side doors when the two pairs of side doors are swung to an open position over the floor.

19. The container of claim 16, further comprising a coupling bar configured to be grasped by a hook lift transport vehicle in order to load the container on the hook lift transport vehicle.

20. The container of claim 16, further comprising a cable hook configured to be grasped by a winch cable in order to load the container upon a roll-off transport vehicle.

21. The container of claim 16, wherein the base frame further comprises two forklift pockets transversely disposed perpendicular to the tracks, each of the plurality of forklift pockets configured for receiving a forklift blade.

22. The container of claim 21, wherein each of the forklift pockets further comprises at least one pass-through passing through one of the tracks and permitting passage of a forklift blade through the track.

* * * * *